United States Patent [19]
Klann

[11] Patent Number: 6,158,664
[45] Date of Patent: Dec. 12, 2000

[54] BIMETALLIC STEAM TRAP

[75] Inventor: Holm Klann, Bremen, Germany

[73] Assignee: Gestra GmbH, Bremen, Germany

[21] Appl. No.: 09/358,155

[22] Filed: Jul. 20, 1999

[30] Foreign Application Priority Data

Aug. 28, 1998 [DE] Germany .......................... 198 39 298

[51] Int. Cl.$^7$ ...................................................... F16T 1/04
[52] U.S. Cl. .............................. 236/59; 374/205; 337/335
[58] Field of Search ................................. 236/59, 101 B, 236/93 R; 374/205; 337/335

[56] References Cited

U.S. PATENT DOCUMENTS 4,561,588  12/1985  Foller ..................................... 236/93 R

FOREIGN PATENT DOCUMENTS

| 0202377 | 3/1959 | Austria | 374/205 |
| 1 183 098 | 12/1964 | Germany . | |
| 1 917 348 | 6/1965 | Germany . | |
| 1 261 127 | 2/1968 | Germany . | |

*Primary Examiner*—William E. Tapolcai
*Assistant Examiner*—Mohammad M. Ali
*Attorney, Agent, or Firm*—Collard & Roe, P.C.

[57] ABSTRACT

The bimetallic plates of the steam trap disclosed each comprise three same-direction active arms next to one another extending transversely to a center line. On the center line two active arms extend in opposite directions to one another and transversely to the other active arms. On the side of the bimetallic plates which curve concavely when deflected there are provided projections as support portions or faces for the active arms. The projections of at least two active arms project beyond those of the other active arms. The projections of the active arms come into effect at different temperatures and with accumulative force. The bimetallic plates therefore have a closing force line closely adapted to the saturated steam curve.

15 Claims, 3 Drawing Sheets

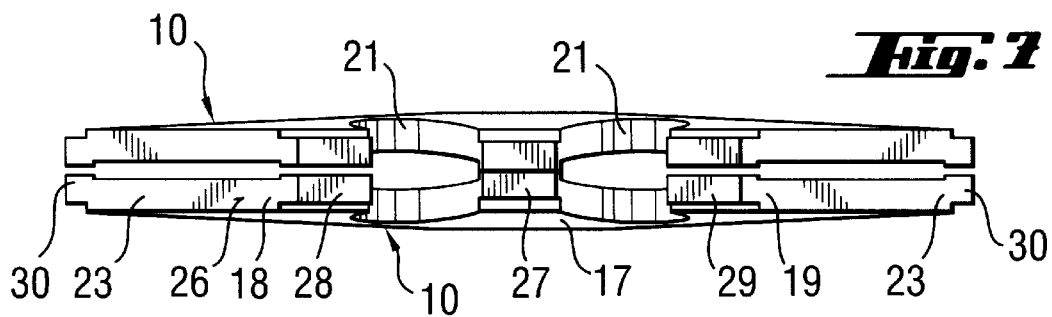
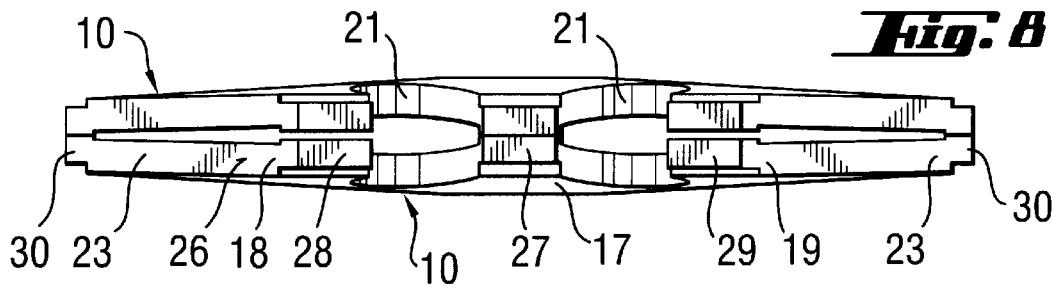
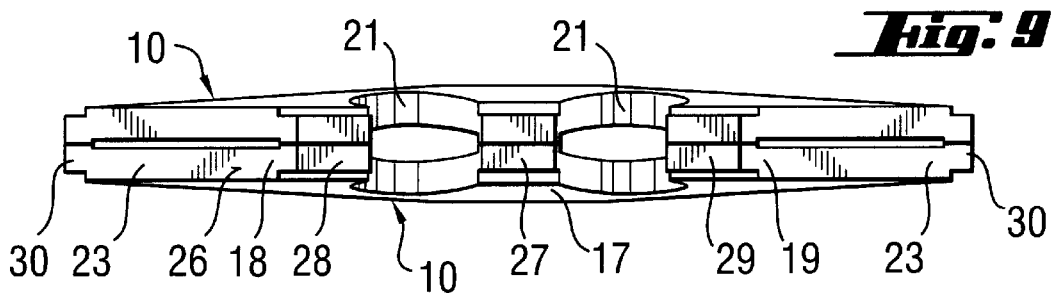
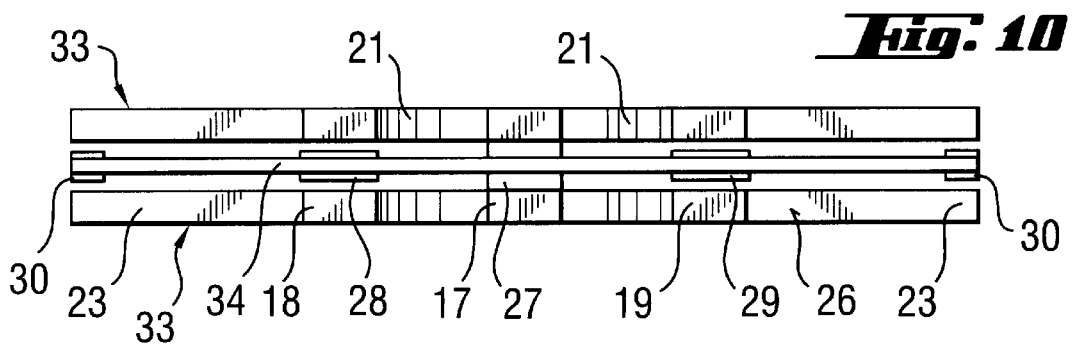
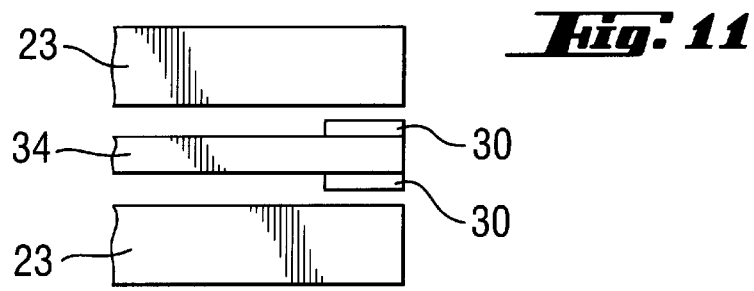

BIMETALLIC STEAM TRAP

BACKGROUND OF THE INVENTION

1. Field of the Invention

The invention relates to a steam trap. More particularly it relates to a steam trap of the type having a bimetallic control element arranged on the preliminary pressure side of the trap and a closure member actuated by the bimetallic control member which is biased in the opening direction by the preliminary pressure and which cooperates with a valve seat.

2. The Prior Art

A known steam trap of this type (DE-AS 1 183 098) comprises a control element with a plurality of circular bimetallic plates. Radial slots in the bimetallic plates form active arms whose ends support the bimetallic plates. The bimetallic plates have identical dimensions apart from the slot lengths, i.e. a bimetallic plate with longer slots and a bimetallic plate with shorter slots and therefore shorter active arms are provided. The active arms of a bimetallic plate are all of equal length in each case. Owing to the different bimetallic plates, the control element has a closing force line which is adapted to the saturated steam curve of the condensate to be drained. A significant drawback of this known steam trap resides in the need for different bimetallic plates.

With another known steam trap (DE AS 1 261 127, DE GM 1 917 348) the active arms of the bimetallic plates have different lengths. Each bimetallic plate therefore has a closing force line adapted to the saturated steam curve. However, these bimetallic plates are very large and protrude outwardly. Therefore, this steam trap requires a large housing.

SUMMARY OF THE INVENTION

It is the object of the invention to provide a steam trap of the type mentioned at the outset with compact bimetallic plates without the need for a plurality of different bimetallic plates.

This object is achieved by the provision of a steam trap of the aforementioned type wherein support portions for the ends of the active arms are provided on the side of the bimetallic plate that curves concavely when deflected.

The support portions of at least two of the active arms are offset in height relative to the support portions of the other active arms such that the ends of the active arms are supported at different temperatures and the closing force applied by the bimetallic plate is adapted to a predetermined pressure-temperature curve.

Owing to the offset in height of the support portions, the active arms affect the closing force line differently. Without the need for great differences in length between the active arms, each bimetallic plate has an individual closing force line adapted to the saturated steam curve of the condensate to be drained. Bimetallic plates having a different configuration are not required this purpose. In accordance with the invention, bimetallic plates with small dimensions can exert a great closing force.

Preferably, the bimetallic plates of the steam trap are provided with (a) three substantially same-direction active arms next to one another formed by slots extending substantially transversely to a first center line and (b) two active arms in the region of the first center line extending in opposite directions to one another and transversely to the same-direction active arms. In this way, the closing force line of the bimetallic plates can be adapted closely to the saturated steam curve over a particularly large pressure range without the need for large outwardly protruding bimetallic plates. The slots are merely small recesses in the bimetallic plates so a relatively large active plate face is obtained despite small plate dimensions, and the generated closing force is correspondingly great.

In a preferred embodiment of the invention, the narrow active arms initially come into effect in advance of the others. The increase in closing force demands a relatively large rise in temperature. This leads to a closing force line of the bimetallic plates which is particularly well adapted to the steeply rising saturated steam curve in the low pressure range.

Preferably, the active arms of the bimetallic plates extending transversely to the others are much stiffer than the above-mentioned narrower active arms. They come into effect in addition to the narrower active arms at higher temperatures. A rise in temperature therefore leads to a more pronounced increase in the closing force. The closing force line of the bimetallic plates extends with a flatter inclination better adapted to the saturated steam curve at the corresponding temperatures. At even higher temperatures, the four shorter active arms will come into effect. This also takes place accumulatively so the increase in closing force is correspondingly greater during a further rise in temperature and the inclination of the closing force line flattened again. Good adaptation of the closing force line to the saturated steam curve is therefore ensured over a very large pressure and temperature range. It is also advantageous here to have the width of the active arms decrease toward the end of the plate.

In a further embodiment, the length of the active arms is such that their ends extend to a circle whose center is common with the center of the bimetallic plates. This arrangement combines a well adapted closing force line and a closing force which is particularly great in relation to the dimensions of the bimetallic plates. Also advantageous for this purpose is to form the external contour of the bimetallic plates as a straight line extending obliquely to the first center line between the end of the outer active arms of the same-direction active arms and the adjacent active arms extending transversely thereto. In addition, this arrangement permits the sides of the outer same-direction active arms and those of the active arms extending transversely thereto to be easily formed at the same time.

Preferably, the offset in height of the support portions is provided directly on the bimetallic plates. Preferably, the support portions are defined exactly by the projections. They can be produced particularly advantageously by embossing the ends of the active arms. Alternatively, the offset in height of the support faces can be achieved with inserts.

It is particularly advantageous in adapting the closing force line to the saturated steam curve, if the offset in height is only a fraction of the thickness of the bimetallic plate. Deformation of the bimetallic plates is so slight that detrimental stresses in them are avoided.

Preferably, the bimetallic plates are symmetric about both the first center line and a second transverse center line and at least two bimetallic plates are superimposed so that their sides have opposing deflection. This arrangement of the bimetallic plates produces a large working stroke of the control element.

Preferably, the bimetallic plates are formed with a slot-free region along the first center line having a width greater than the length of the slot. This arrangement provides a large slot-free central portion of the bimetallic plates which is beneficial to the working stroke. Preferably, the bimetallic plates have guide bores for guide pins in the slot-free region on the first center line to allow the bimetallic plates to be arranged non-rotatably relative to each other in a simple manner without adversely affecting the closing force line or the service life of the bimetallic plates.

An embodiment of the steam trap according to the invention is shown in the drawings. FIGS. 3, 4 and 7 to 10 are on a different scale from FIGS. 1 and 2. FIGS. 5 and 11 are also on a different scale.

BRIEF DESCRIPTION OF THE DRAWINGS

Other objects and features of the present invention become apparent from the following detailed description considered in connection with the accompanying drawings which disclose the embodiment of the present invention. It should be understood, however, that the drawings are designed for the purpose of illustration only not as a definition of the limits of the invention.

In the drawings, wherein similar reference characters denote similar elements throughout the several views:

FIG. 7 shows the bimetallic plates from FIG. 4 at low operating pressure and the steam trap in the closed position, FIG. 8 shows the bimetallic plates from FIG. 4 with medium operating pressure and the steam trap in the closed position, FIG. 9 shows the bimetallic plates from FIG. 4 with high operating pressure and the steam trap in the closed position, FIG. 10 shows a further embodiment of the invention using an insert and showing two superimposed bimetallic plates of the control element in the cold state, and FIG. 11 is a detail of the right-hand portion of the bimetallic plates from FIG. 10.

DETAILED DESCRIPTION OF PREFERRED EMBODIMENTS

Figure 1:
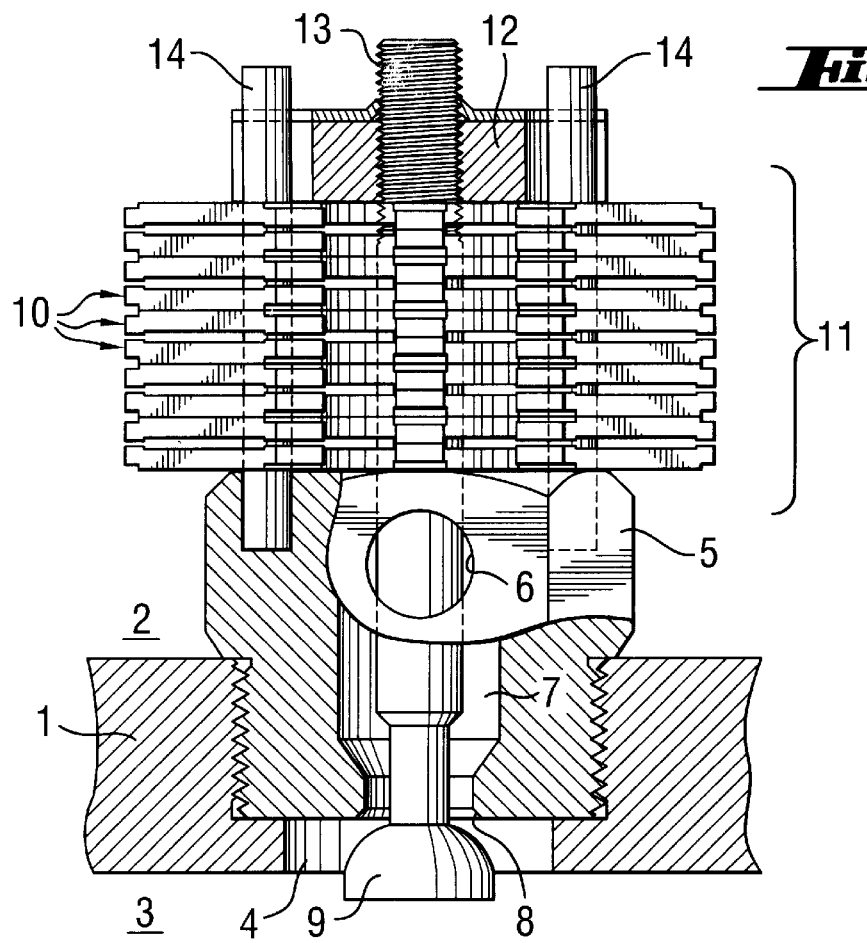
FIG. 1 is a longitudinal section through the steam trap in the open position.

Turning now in detail to the drawings, FIG. 1 shows a partition wall 1 between the preliminary pressure side 2 and the low pressure side 3 of a steam trap housing (not shown). Partition wall 1 comprises a connecting orifice 4 in which a seat bush 5 is arranged. The seat bush 5 comprises at least one lateral feed orifice 6 which opens into a longitudinal orifice 7 of the seat bush 5.

Figure 2:
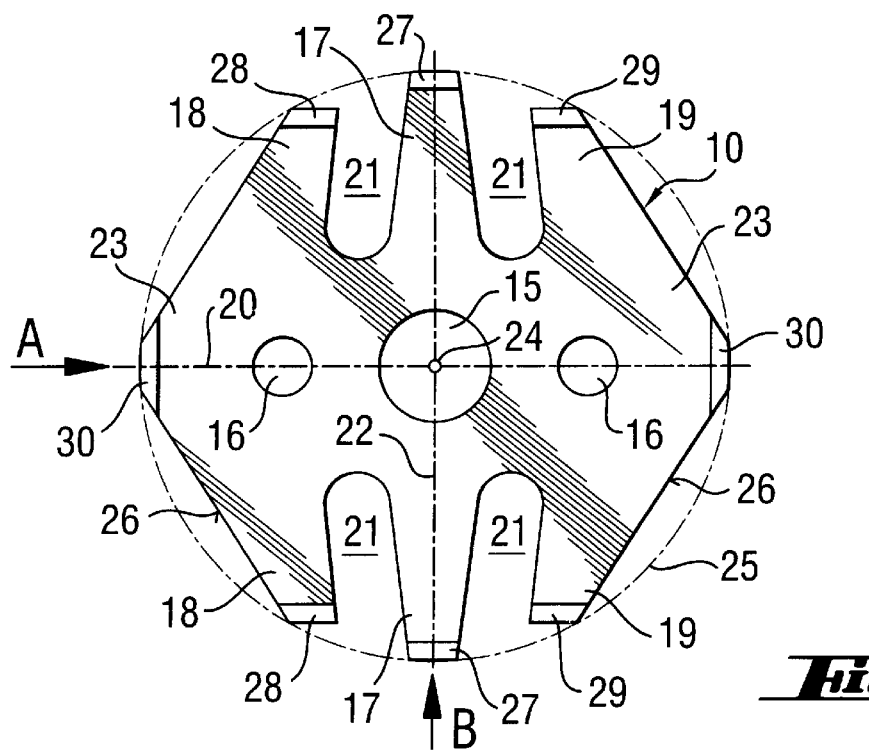
FIG. 2 is a plan view of a bimetallic plate of the control element, more specifically the side with concave deflection.

On the seat bush 5 is provided a valve seat 8 which faces the lower pressure side 3 and with which a closure member 9 co-operates. Closure member 9 is loaded or biased in the opening direction by the preliminary pressure. A control element 11 comprising a plurality of bimetallic plates 10 acts on the closure member 9 in the closing direction. The bimetallic plates 10 are superimposed in such a way that they deflect in opposite directions on heating. At one of its ends, the control element 11 is supported with the convexly curved side of the bimetallic plate there on the seat bush 5. At its other end, the control element 11 acts with the convexly curved side of the bimetallic plate there via a driver 12 and a reciprocating shaft 13 on the closure member 9. The reciprocating shaft 13 extends longitudinally through the center of control element 11. Parallel to the reciprocating shaft 13 there extend two guide pins 14 arranged on the seat bush 5 for non-rotatable guidance of the bimetallic plates 10 by the control element 11. For this purpose, the bimetallic plates 10 have a central orifice 15 for the reciprocating shaft 13 and two guide orifices 16 for the guide pins 14 (FIG. 2).

To form active arms 17 to 19, the bimetallic plates 10 are provided with two slots 21 on either side of a first center line 20 extending in the plane of the plate and substantially transversely thereto. On either side of the first center line 20, the bimetallic plates 10 therefore each have three active arms 17 to 19 next to each other extending substantially transversely to the first center line 20 and substantially in the same direction. The two diametrically opposed central active arms 17 are arranged on a second center line 22 extending transversely to the first. The two diametrically opposed outer active arms 18 are a mirror image to the other two diametrically opposed outer active arms 19. Along the first center line 20, the bimetallic plates 10 have a slot-free region of which the width is greater than the length of each of the slots 21. On either side of the second center line 22 the guide orifices 16 are located on the first center line 20 in this region. The bimetallic plates 10 also comprise two diametrically opposed active arms 23 on the first center line 20. They extend in opposite directions to one another and substantially transversely to the above-mentioned active arms 17 to 19.

All active arms 17 to 19, 23 are of such a length that their ends extend to a circle 25. The center of the circle 25 is common with the center 24 of the bimetallic plates 10. The outer active arms 18, 19 are the shortest of all active arms 17 to 19 and the front faces of their ends extend parallel to the first center line 20. Between the ends of the outer active arms 18, 19 and the active arms 23 extending transversely thereto, the outer contour of the bimetallic plates 10 is designed as a straight line 26 extending obliquely to the first center line 20. With all active arms 17 to 19, 23, the width decreases towards the edge of the plate which is beneficial to the distribution of stresses in the active arms. The central active arms 17 of the three active arms 17 to 19 have the smallest width and the active arms 23 extending transversely thereto the greatest width of all active arms 17 to 19, 23.

Figure 5:
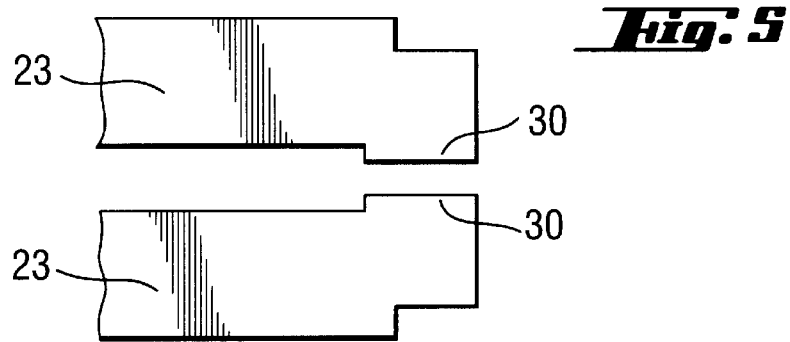
FIG. 5 is a detail of the right-hand portion of the bimetallic plates from FIG. 4.

The active arms 17 to 19, 23 of the bimetallic plates 10 comprise, at their outer ends on the side with concave deflection, projections 27 to 30 as support portions or faces for the active arms 17 to 19, 23. The support faces of the central narrow active arms 17 are offset in height relative to the support faces of the other active arms 18, 19, 23 and project relative to the other support faces. In other words: the projections 27 of the central narrow active arms 17 have a greater height than the projections 28 to 30 of the other active arms 18, 19, 23 with respect to the plane of the bimetallic plates 10. The height of the projections 27 to 30 is produced by embossing the ends of the active arms 17 to 19, 23 and therefore the offset in height between them is only a fraction of the thickness of the bimetallic plates 10 (FIG. 5). Undesirable stresses in the active arms 17 to 19, 23 are avoided owing to this small height and they are sufficient for achieving the desired closing force line 31.

The bimetallic plates 10, in their face (FIG. 2), are symmetrical in design both about the first center line 20 and about the second center line 22. The symmetrically designed bimetallic plates 10 are superimposed in such a way that their concavely curved sides face one another and their identical active arms 17 to 19, 23 with their projections 27 to 30 also face one another. This relative position of the bimetallic plates 10 with respect to one another is continuously ensured by the guide pins 14.

Figure 6:
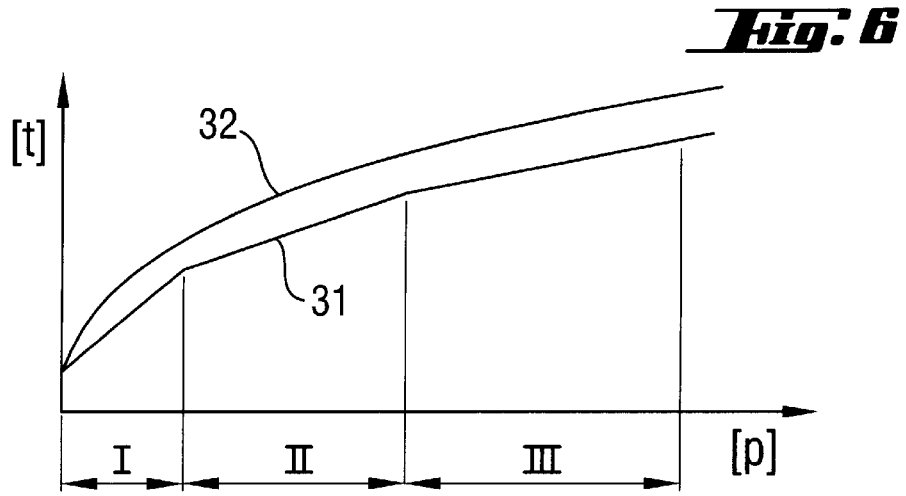
FIG. 6 is a graph showing the saturated steam curve of the condensate to be drained and the closing force line of the control element.

The steam trap can be used for a great range of pressures as shown in FIG. 6. This relates to the operating pressure prevailing in the steam trap on the preliminary pressure side 2. The pressure range is divided into portions I to III.

Figure 3:
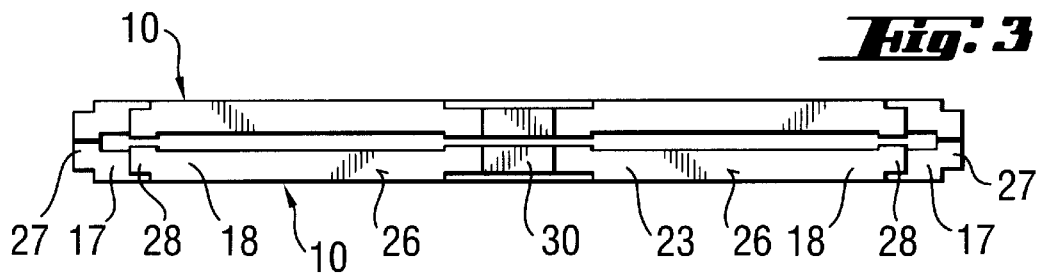
FIG. 3 is a view taken along line A of FIG. 2 of two superimposed bimetallic plates of the control element in the cold state.
Figure 4:
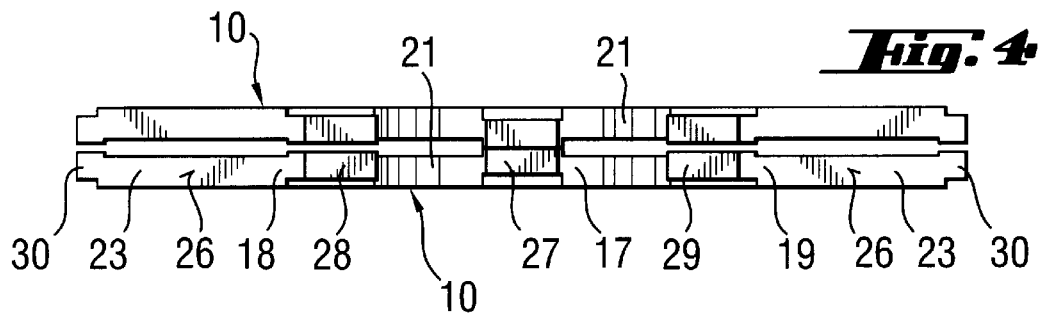
FIG. 4 is a view taken along line B of FIG. 2 of the bimetallic plates from FIG. 3 in the cold state.

When the steam trap is cold, the closure member 9 is in the open position (FIG. 1). The cold bimetallic plates 10 are flat. In this state, they rest on one another only on the projections 27 of the central narrow active arms 17 on their concave side. There is a free gap between the projections 28 to 30 of the other active arms 18, 19, 23 (FIGS. 3 to 5).

If hot condensate flows through the steam trap, the bimetallic plates 10 deflect according to the prevailing temperature. If the operating pressure is in the lower portion I, the closing force exerted by the bimetallic plates 10 via the central narrow active arms 17 exceeds the opening force acting on the closure member 9 when the closing temperature is reached. The strokes of the bimetallic plates 10 are added to the total stroke of the control element 11 and the closure member 9 is brought to rest on the valve seat 8 in a sealing manner. In the closed position also, only the active arms 17 with their projections 27 rest on one another in portion I. There is still a free gap between the projections 28 to 30 (FIG. 7). The inclination of the closing force line 31 of the individual bimetallic plates 10 and therefore also of the entire control element 11 is determined by the thermal properties and spring characteristics of the narrow active arms 17. They require a relatively great rise in temperature for the increase in closing force and this leads to a closing force line 31 well adapted to the steep rise in the saturated steam curve 32 in portion I (FIG. 6).

If the operating pressure is in the central portion II, the closing force applied by the narrow active arms 17 is unable to overcome the opening force acting on the closure member 9. Owing to the higher closing temperature, the wide active arms 23 additionally come to rest on one another with their projections 30 which are set back somewhat (FIG. 8). The closing force of the two active arms 23 is added to the closing force of the narrow active arms 17, whereupon the steam trap in portion II closes on attainment of the closing temperature. Owing to the addition of force and the thermal properties and spring characteristics of the wide active arms 23, the closing force line 31 has a slighter inclination in portion II so good adaptation to the flatter saturated steam curve 32 is also allowed there (FIG. 6).

Although the projections 28, 29 of the outer active arms 18, 19 are identical in height to those projections 30 of the wide active arms 23, they do not come into contact at the same temperatures. This is due to the shorter length of the active arms 18, 19. Finally, the outer short active arms 18, 19 with their projections 28, 29 do not come into contact until the operating pressure is in the upper portion III owing to the correspondingly higher temperatures. All active arms 17 to 19, 23 then rest on one another on their projections 28 to 30. The closing forces of the active arms 18, 19 are added to those of the other active arms 17, 23. The steam trap therefore closes even in portion III on attainment of the closing temperature pertaining to the operating pressure. The inclination of the closing force line 31 is further reduced in portion III, resulting in good adaptation to the saturated steam curve 32 which extends more flatly there.

The bimetallic plates 10 substantially resemble a circular plate in shape, having only small recesses to form slots 21. The bimetallic plates 10 can therefore apply relatively great closing forces with small non-protruding dimensions. Each bimetallic plate 10 has a closing force line 31 well adapted to the saturated steam curve 32 over a large pressure range (portion I–III). Furthermore, the plate shape is completely symmetrical and identical bimetallic plates 10 can be superimposed alternately. Therefore, the control element 11 can be formed from completely identical bimetallic plates 10.

FIGS. 10 and 11 show an alternative design of the bimetallic plates 33. With respect to the configuration of the active arms 17 to 19, 23, they are identical to the bimetallic plates 10. However, the bimetallic plates 33 lack the projections at the ends of their active arms 17 to 19, 23. The ends of the active arms 17 to 19, 23 are all arranged identically in height to one another. Between the mutually facing concavely curved sides of the bimetallic plates 33 is arranged a respective insert 34. This has the projections 27 to 30 on both sides for supporting the active arms 17 to 19, 23. The offset in height of the projections 27 to 30 corresponds to the offset in height of the projections 27 to 30 on the bimetallic plates 10. The bimetallic plates 33 and the inserts 34 are secured against reciprocal rotation, for example by the guide pins 14. Alternatively, the inserts 34 could comprise rotation-preventing parts, for example vertical tongues next to two or more active arms 17 to 19, 23. Furthermore, they can be designed as plane plates with a shape identical to the bimetallic plates 33, as seen in FIG. 2. A closed plate without slots 21 would also be possible. Operation corresponds to that described hereinbefore of the bimetallic plates 10.

Although the embodiments show an offset in height only between the projections 27 on the one hand and the projections 28 to 30 on the other hand, a plurality of differences in height between the projections 27 to 30 can easily be provided.

While several embodiments of the present invention have been shown and described, it is to be understood that many changes and modifications may be made thereunto without departing from the spirit and scope of the invention as defined in the appended claims.

What is claimed is:

1. A bimetallic steam trap comprising (a) a valve seat;

(b) a closure member cooperating with said valve seat and biased in an opening direction at a preliminary pressure; and (c) a control element arranged on the preliminary pressure side of said steam trap acting on said closure member to close said valve at elevated temperatures, said control element comprising at least two superimposed bimetallic plates which deflect when the temperature rises to apply a closing force on said closure member, said plates being slotted to form a plurality of active arms, each of said active arms having a support portion on the concavely curved side of the bimetallic plates when deflected for supporting the ends of the active arms, said support portions of at least two active arms being offset in height relative to the support portions of the other active arms such that the ends of the active arms are supported at different temperatures and the closing force applied by said bimetallic plates is adapted to a predetermined pressure-temperature curve.

2. Bimetallic steam trap according to claim 1, wherein (a) the bimetallic plates are provided with slots substantially transverse to a first center line such that the bimetallic plates on either side of the center line each have three substantially same-direction active arms next to one another, and (b) the bimetallic plates have, in the region of the first center line, two active arms which extend in opposite directions to one another and transversely to the same-direction active arms.

3. Bimetallic steam trap according to claim 2, wherein (a) the central active arms of the same-direction active arms are narrower than the other active arms and longer than the adjacent active arms, and (b) the support portions of the central active arms are arranged so as to project beyond those of the other active arms.

4. Bimetallic steam trap according to claim 2, wherein the active arms extending transversely to the same-direction active arms are longer and wider in design than the outer active arms of the same-direction active arms.

5. Bimetallic steam trap according to claim 1 wherein the width of the active arms decreases toward the edge of the plate.

6. Bimetallic steam trap according to claim 1 wherein the length of the active arms is such that their ends extend to a circle whose center is common with the center of the bimetallic plates.

7. Bimetallic steam trap according to claim 2 wherein the external contour of the bimetallic plates between the end of the outer active arms of the same-direction active arms and the adjacent active arm extending transversely thereto is formed as a straight line extending obliquely to the first center line.

8. Bimetallic steam trap according to claim 2 wherein (a) the bimetallic plates on the side with concave deflection comprise projections with the support portions at the ends of the active arms, and (b) the projections have a different height relative to the bimetallic plate corresponding to the offset in height of the support portions.

9. Bimetallic steam trap according to claim 8, wherein the projections are formed by embossing the ends of the active arms.

10. Bimetallic steam trap according to claim 1 wherein the offset in height of the support portions is a fraction of the thickness of the bimetallic plate.

11. Bimetallic steam trap according to claim 8, wherein (a) the bimetallic plates are symmetrical in design about both the first center line and a second center line extending transversely to the first, (b) at least two bimetallic plates are superimposed with opposing deflection such that identical active arms face one another and (c) the bimetallic plates are arranged so that they are non-rotatable to each other.

12. Bimetallic steam trap according to claim 2 wherein the bimetallic plates comprise, along the first center line, a slot-free region having a width which is greater than the length of the slot.

13. Bimetallic steam trap according to claim 12, wherein the bimetallic plates have guide bores for guide pins in the slot-free region on the first center line.

14. A bimetallic steam trap comprising (a) a valve seat;

(b) a closure member cooperating with said valve seat and biased in an opening direction at a preliminary pressure; and (c) a control element arranged on the preliminary pressure side of said steam trap acting on said closure member to close said valve at elevated temperatures, said control element at least two superimposed bimetallic plates which deflect when the temperature rises to apply a closing force on said closure member, said plates being slotted to form a plurality of active arms, each of said active arms having ends identical in height, and inserts on the concavely curved side of the bimetallic plates when deflected, the bimetallic plates and the inserts being arranged so as to be non-rotatable relative to each other, each insert comprising a support portion for supporting the ends of the active arms, said support portions of the inserts for at least two active arms being offset in height relative to the support portions of the inserts for the other active arms such that the ends of the active arms are supported at different temperatures and the closing force applied by said bimetallic plates is adapted to a predetermined pressure-temperature curve.

15. Bimetallic steam trap according to claim 14, wherein (a) the bimetallic plates are symmetrical in design about both the first center line and a second center line extending transversely to the first, (b) at least two bimetallic plates are superimposed with opposing deflection and (c) the inserts comprise support portions which are offset in height on both sides for the bimetallic plates.

\* \* \* \* \*

UNITED STATES PATENT AND TRADEMARK OFFICE
CERTIFICATE OF CORRECTION

PATENT NO.    : 6,158,664
DATED         : December 12, 2000
INVENTOR(S)   : Holm KLANN It is certified that error appears in the above-identified patent and that said Letters Patent is hereby corrected as shown below:

> In column 8, line 24, (line 9 of claim 14), after "element" insert --comprising--.

Signed and Sealed this

First Day of May, 2001

*Attest:*

NICHOLAS P. GODICI

*Attesting Officer*     *Acting Director of the United States Patent and Trademark Office*